Aug. 5, 1969  E. WRAY  3,459,284
DISC SEGMENT COOLING MEANS
Filed Aug. 16, 1967
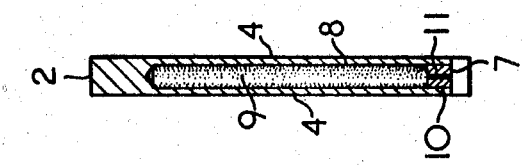
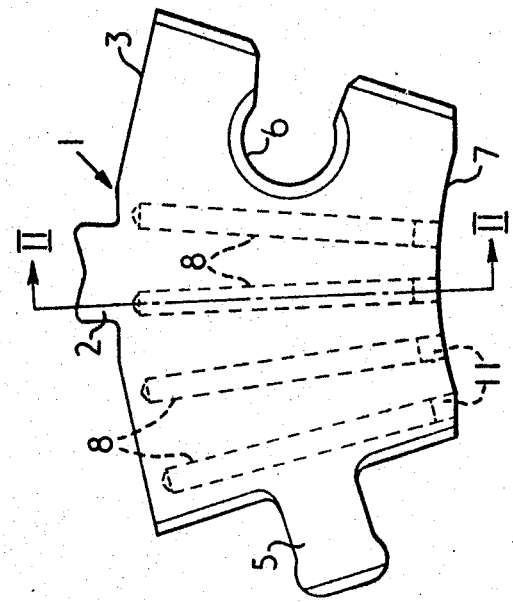

3,459,284
DISC SEGMENT COOLING MEANS

Edward Wray, Rugby, England, assignor to The Dunlop Company Limited, Erdington, England, a corporation of Great Britain
Filed Aug. 16, 1967, Ser. No. 661,043
Int. Cl. F16d *65/84, 13/72*
U.S. Cl. 188—264　　　　　　　　　　　　　　7 Claims

ABSTRACT OF THE DISCLOSURE

The invention relates to an arcuate segment for assembly with similar segments to form an annular friction member for a brake. The segment is comprised of a container portion formed from steel or similar material and including inserts of a material having a high specific heat received in cavities formed in the container portion between the braking surfaces of the friction member.

---

This invention relates to disc brakes and particularly to friction members for disc brakes.

According to one aspect of the present invention an arcuate segment for assembly with similar segments to form an annular friction member for a brake comprises a container of steel or similar material having opposite side faces to form braking surfaces and incorporating a core formed from or containing a material having a high specific heat.

According to another aspect of the invention an arcuate segment for assembly with similar segments to form an annular friction member for a brake comprises a container portion formed from steel or similar material and including inserts of a material having a high specific heat received in cavities formed in the container portion between the braking surfaces of the friction member.

In a preferred construction in accordance with the invention an arcuate segment for assembly with similar segments to form an annular friction member for a brake comprises a container portion formed from steel or similar material and including cylindrical rods of a material having a high specific heat received in cylindrical cavities formed between the braking surfaces of the container portion.

By the term "a material having a high specific heat" as used in this specification is meant any material having a specific heat greater than that of steel, the other physical properties and the chemical properties of which are acceptable for a material which is to be incorporated in the core of a brake friction member.

The expression "steel or similar material" as used in this specification means materials which exhibit high durability and low distortion when subjected to the thermal and mechanical stresses encountered during braking. Such materials include steel, particularly air-hardened high-tensile steel, copper and iron.

Two embodiments of the invention will now be described, by way of example, with reference to the accompanying drawings in which:

FIGURE 1 is an axial view of an arcuate segment according to the invention, in elevation, and FIGURE 2 shows a section taken on the line II—II in FIGURE 1.

An aircraft brake of the kind described and illustrated in the specification of our U.K. Patent No. 931,031 comprises interleaved sets of annular rotor and stator members. The stator members are of multiple-segment construction, having pads of friction material secured to their side faces for engagement with the corresponding surfaces of the rotor members, and are axially slidably but non-rotatably mounted on a fixed axle.

The rotor members are also of generally annular shape and each comprises a plurality of interlocking segments. As shown in the drawings, each segment 1, has a drive lug 2 formed on its outer periphery 3 for engagement with corresponding keyways (not shown) formed on the inner periphery of an associated wheel rim (not shown).

The rotor segments 1 are each formed from a single piece of steel, which constitutes a container portion, provided with flat opposite side surfaces 4 for frictional engagement with the adjacent stator members (not shown) and with an extension 5 at one end and a recess 6 at the other end to enable the segments to be fitted together in the manner of "jig-saw" pieces to form the complete rotor.

Each container portion is bored radially from its inner periphery 7 to form cylindrical cavities 8 at a plurality of circumferentially evenly-spaced positions, the cavities extending almost to the outer periphery 3 of the container portion, and cylindrical beryllium rods 9 of corresponding diameters are fitted into the cavities so as substantially to fill them. The radially inner ends 10 of the cavities 8 are closed by metal plugs 11 drive-fitted in the cavities to retain the beryllium rods in position.

The beryllium rods 9 each constitute a core of beryllium which has the effect of maintaining the thermal capacity of the rotor segment with a reduction in its weight, while the steel container portion completely surrounds the beryllium to prevent it from being subjected to wear in operation of the brake. This method of construction is particularly simple, enabling the segments to be produced at a low cost.

Examples of materials having a high specific heat which may be used in the construction of an annular segment of a friction member for a brake, according to the invention, include carbon and sodium hydride besides beryllium.

A friction member according to the invention may constitute a brake rotor as described above, or a brake stator, and the braking surfaces of the friction member may be constituted either by the opposite side surfaces of the container portion or by a layer of another material sintered or otherwise secured thereto.

Although the present invention has been illustrated and described in connection with a single example embodiment, it will be understood that this is illustrative of the invention, and is by no means restrictive thereof. It is reasonably to be expected that those skilled in this art can make numerous revisions and adaptations of the invention.

Having now described my invention, what I claim is:

1. An arcuate segment for assembly with similar segments to form an annular friction member for a brake comprising a container of steel or similar material having opposite side faces to form braking surfaces and incorporating a plurality of spaced cavities each having a core material having a high specific heat and disposed between the braking surfaces of said member, said cavities being disposed to extend radially with respect to the axis of the segment and each having plugs to close the ends thereof and thereby retain the core material within such cavities.

2. An arcuate segment according to claim 1 wherein the cavities extend outwardly from the inner periphery of the segment.

3. An arcuate segment according to claim 1 wherein the cavities are formed in circumferentially evenly-spaced positions.

4. An arcuate segment according to claim 1 having an extension formed at one end and a recess formed at the other end to enable the segment to be assembled with similar segments in the manner of "jig-saw" pieces to form the complete annular friction member.

5. An arcuate segment according to claim 1 having drive lugs formed on the outer periphery thereof for engagement with corresponding keyways formed in the inner periphery of an associated wheel rim.

6. An arcuate segment for assembly with similar segments for forming an annular friction member comprising a container of steel or similar material having opposite side faces forming braking surfaces, said container having a number of spaced cylindrical cavities disposed between the braking surfaces and extending radially with respect to the axis of the segment, cylindrical rods of a material having a high specific heat, the rods being locatable in the cylindrical cavities, and a plug for each cavity to retain the respective rod therein.

7. An arcuate segment according to claim 6 wherein the plugs are of metal and are drive-fitted into the cavities.

References Cited

UNITED STATES PATENTS

| | | |
|---|---|---|
| 2,093,772 | 9/1937 | Colwell. |
| 3,105,575 | 10/1963 | Dewar et al. |
| 3,208,559 | 9/1965 | Chambers et al. |

FOREIGN PATENTS

| | | |
|---|---|---|
| 1,225,964 | 2/1960 | France. |

GEORGE E. A. HALVOSA, Primary Examiner

U.S. Cl. X.R.

192—113